(12) United States Patent
Brownell et al.

(10) Patent No.: US 8,019,910 B2
(45) Date of Patent: Sep. 13, 2011

(54) TRANSACTION FLOW CONTROL IN PCI EXPRESS FABRIC

(75) Inventors: Paul V Brownell, Houston, TX (US); David L. Matthews, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 11/831,861

(22) Filed: Jul. 31, 2007

(65) Prior Publication Data
US 2009/0037616 A1 Feb. 5, 2009

(51) Int. Cl.
*G06F 3/00* (2006.01)
*G06F 13/36* (2006.01)

(52) U.S. Cl. ............ 710/29; 710/52; 710/56; 710/57; 710/310; 370/230; 370/231; 370/235; 370/236; 711/173

(58) Field of Classification Search .......... 710/29
See application file for complete search history.

(56) References Cited

U.S. PATENT DOCUMENTS

| | | | | |
|---|---|---|---|---|
| 5,664,116 A * | 9/1997 | Gaytan et al. | ............ | 709/234 |
| 6,108,741 A * | 8/2000 | MacLaren et al. | ........ | 710/314 |
| 6,304,932 B1 | 10/2001 | Ziegler | ............ | 710/112 |
| 6,418,503 B1 * | 7/2002 | Moertl et al. | ............ | 710/310 |
| 6,480,917 B1 * | 11/2002 | Moertl et al. | ............ | 710/119 |
| 6,480,923 B1 * | 11/2002 | Moertl et al. | ............ | 710/305 |
| 6,615,295 B2 * | 9/2003 | Shah | ............ | 710/54 |
| 6,657,955 B1 * | 12/2003 | Bonneau et al. | ............ | 370/229 |
| 6,687,240 B1 * | 2/2004 | Moertl et al. | ............ | 370/351 |
| 6,757,768 B1 * | 6/2004 | Potter et al. | ............ | 710/112 |
| 6,760,793 B2 | 7/2004 | Kelly | ............ | 710/52 |
| 7,028,116 B2 * | 4/2006 | Shah | ............ | 710/112 |
| 7,313,810 B1 * | 12/2007 | Bell et al. | ............ | 725/116 |
| 7,424,566 B2 * | 9/2008 | Manula et al. | ............ | 710/310 |
| 7,525,986 B2 * | 4/2009 | Lee et al. | ............ | 370/462 |
| 7,581,044 B1 * | 8/2009 | Davis | ............ | 710/52 |
| 2002/0108004 A1 * | 8/2002 | Shah | ............ | 710/39 |
| 2003/0058877 A1 * | 3/2003 | Rumph | ............ | 370/412 |
| 2003/0123393 A1 | 7/2003 | Feuerstraefer | ............ | 370/235 |
| 2003/0158992 A1 | 8/2003 | Ajanovic et al. | ............ | 710/305 |
| 2005/0251612 A1 | 11/2005 | Creta et al. | ............ | 710/316 |
| 2005/0289278 A1 | 12/2005 | Tan et al. | ............ | 710/310 |
| 2006/0098618 A1 | 5/2006 | Bouffioux | ............ | 370/349 |
| 2006/0101179 A1 | 5/2006 | Lee et al. | ............ | 710/113 |
| 2006/0129699 A1 | 6/2006 | Kagan et al. | ............ | 709/250 |
| 2006/0173986 A1 * | 8/2006 | Ikeda et al. | ............ | 709/223 |
| 2007/0112995 A1 | 5/2007 | Manula et al. | ............ | 710/310 |
| 2008/0063004 A1 * | 3/2008 | Himberger et al. | ............ | 370/413 |
| 2008/0072098 A1 * | 3/2008 | Hunsaker et al. | ............ | 713/501 |

(Continued)

OTHER PUBLICATIONS

'PCI Express Base Specification' Revision 1.0a, by PCI-SIG, Apr. 15, 2003.*

(Continued)

*Primary Examiner* — Henry W Tsai
*Assistant Examiner* — Steven G Snyder (57) ABSTRACT

A computer-executed method for controlling transaction flow in a network comprises communicating transaction packets among a plurality of devices in a network fabric and subdividing a memory into a plurality of memory segments for storing received transaction cycles according to transaction packet type comprising posted, non-posted, and completion cycles. A plurality of transaction cycles are received in the memory segment plurality at a target device and transaction cycle priority is allocated according to transaction packet type wherein posted cycles have highest priority. Cycles are retrieved from the memory segment plurality in an order determined by priority.

18 Claims, 5 Drawing Sheets

U.S. PATENT DOCUMENTS

2008/0172499 A1* 7/2008 Moriki et al. .................. 710/22

OTHER PUBLICATIONS

'Non-Transparent Bridging Makes PCI-Express HA Friendly' by Kazmi, CommsDesign, Aug. 14, 2003.*

'End-To-End Arguments in System Design' by Seltzer et al., ACM Transactions on Computer Systems, vol. 2, Issue 4, Nov. 1984.*

'PCI Express to PCI/PCI-X Bridge Specification' Revision 1.0, by PCI-SIG, Jul. 14, 2003.*

* cited by examiner

TRANSACTION FLOW CONTROL IN PCI EXPRESS FABRIC

BACKGROUND

In an implementation of quality of service (QoS) for transaction packets within a PCI Express fabric, posted and non-posted packets can potentially lock up a system if ordering rules are not followed. For example, two devices at either end of a network fabric can issue a number of non-posted requests and wait for completions. Inbound completions might be blocked by other inbound requests.

SUMMARY

An embodiment of a computer-executed method for controlling transaction flow in a network comprises communicating transaction packets among a plurality of devices in a network fabric and subdividing a memory into a plurality of memory segments for storing received transaction cycles according to transaction packet type comprising posted, non-posted, and completion cycles. A plurality of transaction cycles are received in the memory segment plurality at a target device and transaction cycle priority is allocated according to transaction packet type wherein posted cycles have highest priority. Cycles are retrieved from the memory segment plurality in an order determined by priority.

BRIEF DESCRIPTION OF THE DRAWINGS

Embodiments of the invention relating to both structure and method of operation may best be understood by referring to the following description and accompanying drawings.

DETAILED DESCRIPTION

A computing system and associated method can provide quality of service (QoS) in a Peripheral Component Interconnect (PCI) Express fabric using packet type.

A PCI Express fabric that delivers packets from multiple blades is subject to clogging by lower priority packets such as non-posted and completion cycles. An illustrative method enables correct ordering of end-to-end cycle flow based on packet type.

Each end device in the PCI Express fabric has a limited amount of random access memory (RAM) space to store inbound packets. An end-to-end flow control method disclosed herein prevents memory overflow. To prevent packets such as non-posted cycles from filling receiver memory space and preventing transmission of posted cycles, a method assigns higher priority to posted packets.

Each end device in the PCI Express fabric has a limited amount of RAM space to store inbound packets. An illustrative computing system and associated method subdivides receiver memory space by packet type including posted, non-posted, and completion packet types.

Figure 1:
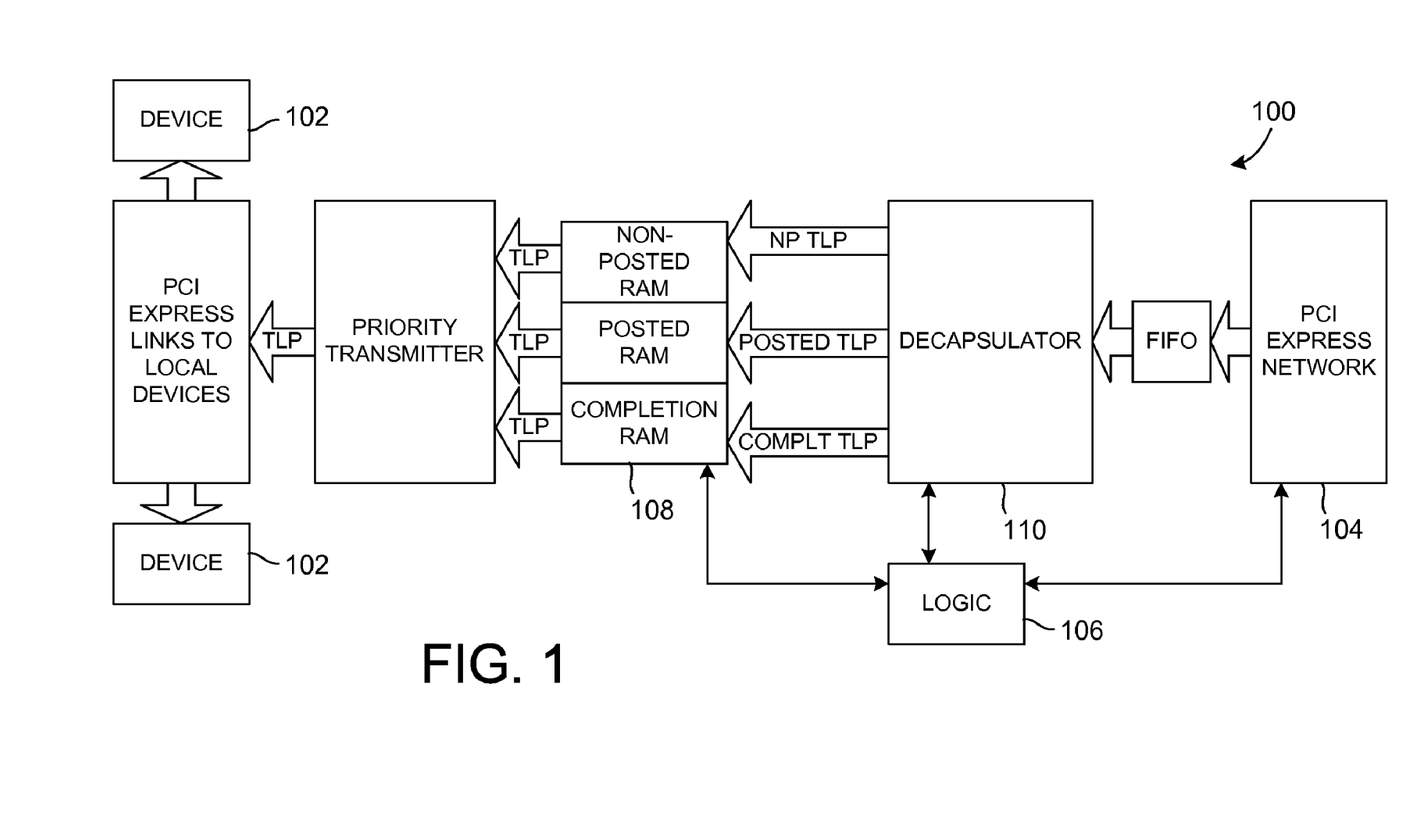
FIG. 1 is a schematic block diagram illustrating an embodiment of a computing system which is adapted to provide quality of service (QoS) in a network fabric using packet type.

Referring to FIG. 1, a schematic block diagram illustrates an embodiment of a computing system 100 which is adapted to provide quality of service (QoS) in a network fabric using packet type. The illustrative computing system 100 comprises a plurality of devices 102, a network fabric 104 interconnecting the devices 102, and a logic 106. The logic 106 controls the devices 102 and the network fabric 104 to manage transaction flow control. For example, the logic 106 can operate to subdivide a memory 108 into multiple segments for storing received transaction cycles according to transaction packet type. Packet types include posted, non-posted, and completion cycle types. The logic 106 allocates transaction cycle priority according to transaction packet type wherein posted cycles have highest priority.

The illustrative block diagram shows the cycles split out into different packet type memory (RAMs).

In some embodiments, the logic 106 can further operate to communicate transaction packets among the devices 102 in the network fabric 104, for example by receiving a plurality of transaction cycles in the memory segments located at a target device, and retrieving cycles from the memory segments in an order determined by priority.

The logic 106 can be further operative to communicate transaction packets end-to-end between a plurality of end devices 102 in a Peripheral Component Interconnect (PCI)-Express fabric 104. For example, the logic 106 can initialize end-to-end flow control between the multiple end devices 102 by determining at an initializing end device the capacity of the memory segments for storing received transaction cycles for the posted, the non-posted, and the completion cycles. The initializing end device then broadcasts a packet indicative of the capacity of the memory segments.

The computing system 100 can further comprise a decapsulator 110 that receives multiple transaction cycles at the target device, removes encapsulation information from transaction packets, determines internal packet type, and places packets into the memory segments based on the internal packet type.

During end-to-end flow control initialization, each device 102 advertises the number of posted, non-posted, and completion cycles the device can handle using buffer flow control packets (BFCP). The decapsulator 110 receives inbound requests, removes the encapsulation information, determines the internal packet type, and places the packets into corresponding, separate RAM elements.

A priority transmitter to the end device PCI Express link can be operated to always retrieve cycles from the higher priority RAMs. Accordingly, posted cycles always pass lower priority cycles such as non-posted and completion cycles. The transmitter upon finishing sending in a cycle, issues a BFCP to the cycle originator corresponding to the packet type.

In one example implementation, the logic 106 further operates to allocate transaction cycle priority according to transaction packet type wherein posted cycles have highest priority and completion cycles have lowest priority. In another example implementation, the logic 106 allocates transaction cycle priority according to transaction packet type wherein posted cycles have highest priority and non-posted cycles have lowest priority.

In some embodiments, the network fabric 104 can comprise a Peripheral Component Interconnect (PCI)-Express fabric coupled by a bridge to a conventional PCI bus. The logic 106 communicates transaction packets on the network fabric 104 by issuing a read request from a conventional PCI bus master and issuing a retry from a slave/bridge. Assignment of the elevated or highest priority for the posted cycles prevents potential blocking of posted cycles by completions resulting from the read request while waiting for the conventional PCI bus master to reissue the read request.

Posted cycles are allocated highest priority to facilitate throughput according to operation of PCI Express to avoid deadlock in the case of existence of a bridge between the PCI Express and a conventional PCI bus. When conventional PCI bus master makes a read request, the slave/bridge issues a retry. A resulting completion behind the bridge with higher priority than posted cycles could potentially block the posted cycles while waiting for the conventional bus master to reissue a request.

Referring to FIGS. 2A through 2D, flow charts illustrate one or more embodiments or aspects of a computer-executed method 200 for controlling transaction flow in a network. The illustrative method 200 comprises communicating 202 transaction packets among a plurality of devices in a network fabric and subdividing 204 a memory into multiple memory segments for storing received transaction cycles according to transaction packet type. Packet types include posted, non-posted, and completion cycle types. The method 200 further comprises receiving 206 multiple transaction cycles in the memory segments at a target device and allocating 208 transaction cycle priority according to transaction packet type wherein posted cycles have highest priority. Cycles are retrieved 210 from the memory segments in an order determined by priority.

Figure 2A:
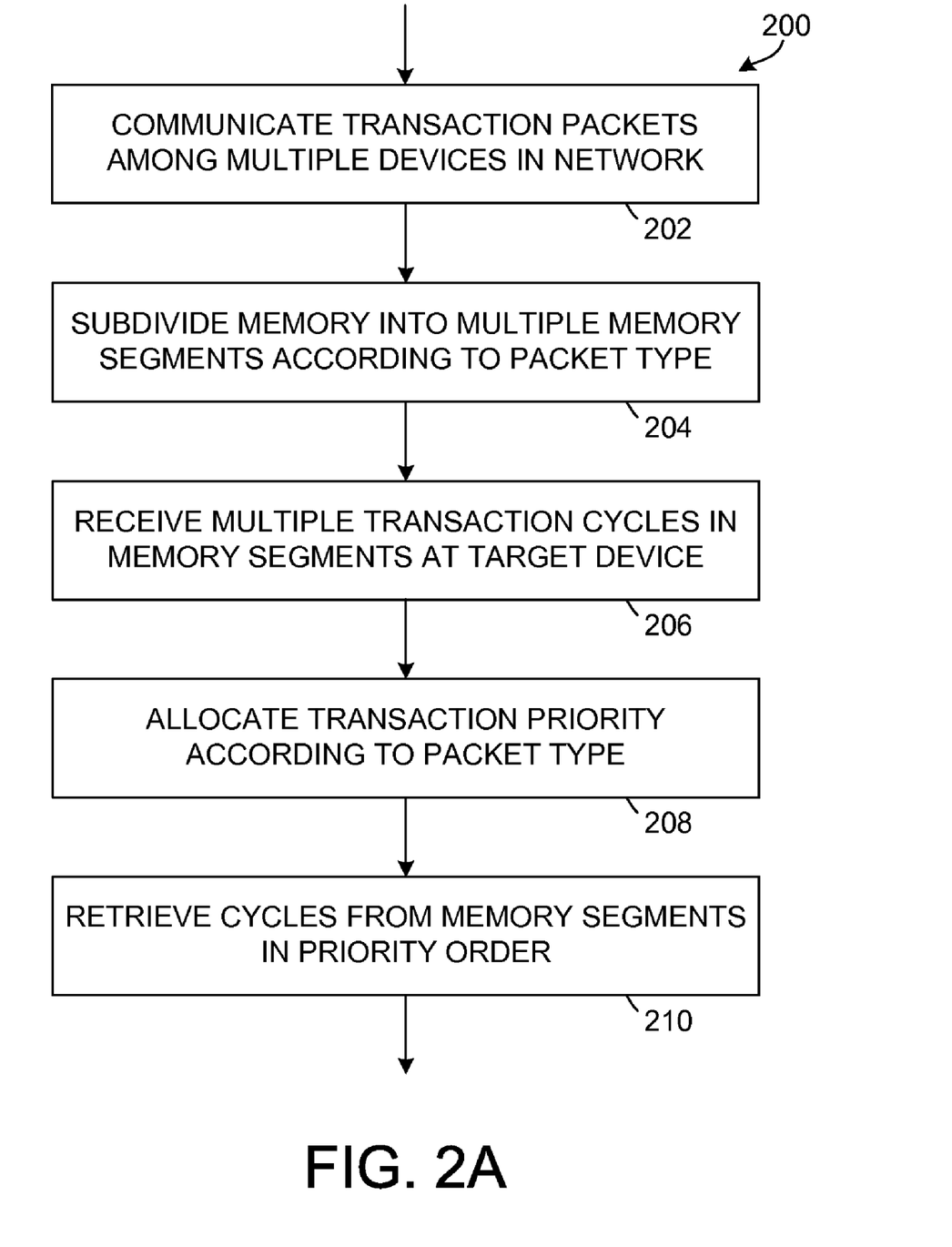
FIGS. 2A through 2D are flow charts showing one or more embodiments or aspects of a computer-executed method for controlling transaction flow in a network.

Transaction packets can be communicated 202 end-to-end between end devices in a Peripheral Component Interconnect (PCI)-Express fabric.

In some embodiments, transaction cycle priority can be allocated 208 according to transaction packet type wherein posted cycles have highest priority and completion cycles have lowest priority. In other embodiments, transaction cycle priority can be allocated 208 so that posted cycles have highest priority and non-posted cycles have lowest priority.

Figure 2B:
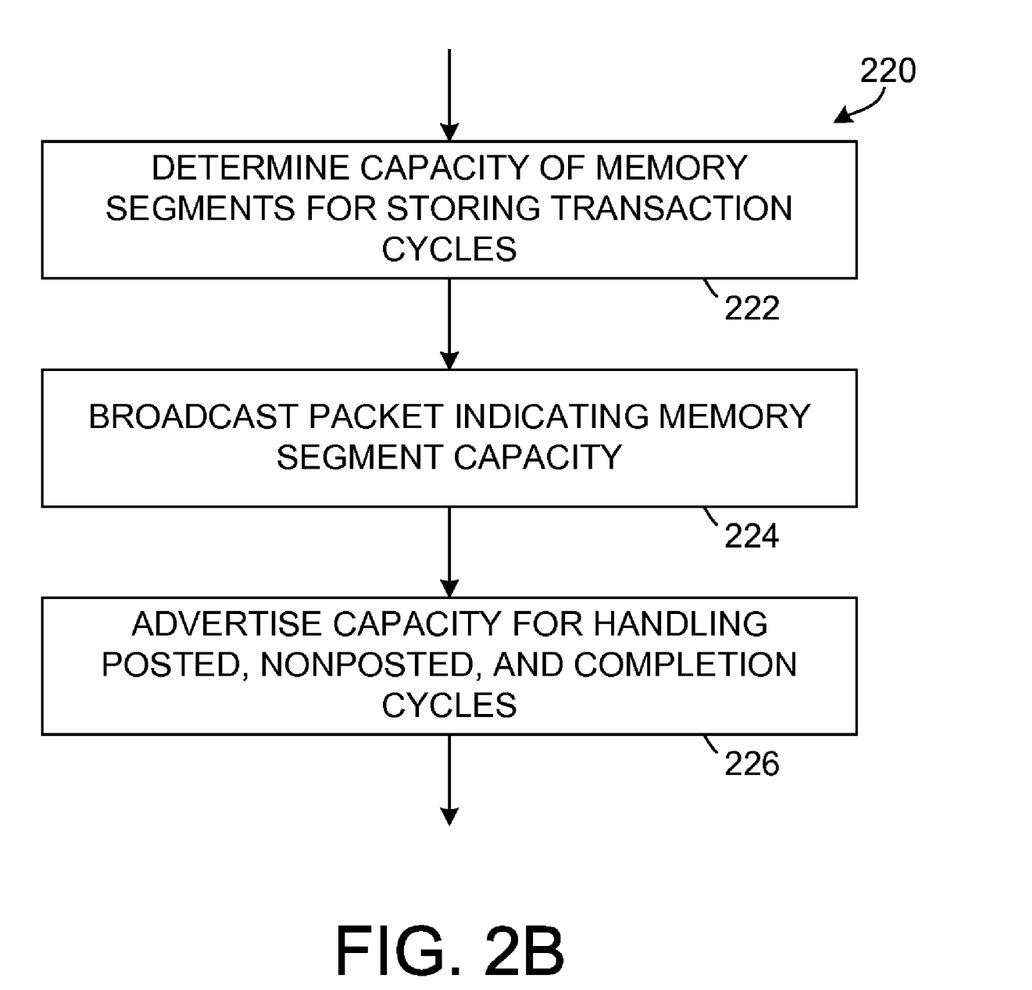

Referring to FIG. 2B, a flow chart depicts an illustrative method for initializing 220 end-to-end flow control between a plurality of end devices comprising determining 222 at an initializing end device the capacity of the memory segments for storing received transaction cycles for the posted, the non-posted, and the completion cycles. The initializing end device broadcasts 224 a packet indicative of the memory segment plurality capacity.

In some embodiments, initializing 220 end-to-end flow control between the end devices can further comprise advertising 226 from one or more of the devices the capacity for handling posted, non-posted, and completion cycles using buffer flow control packets (BFCP).

Figure 2C:
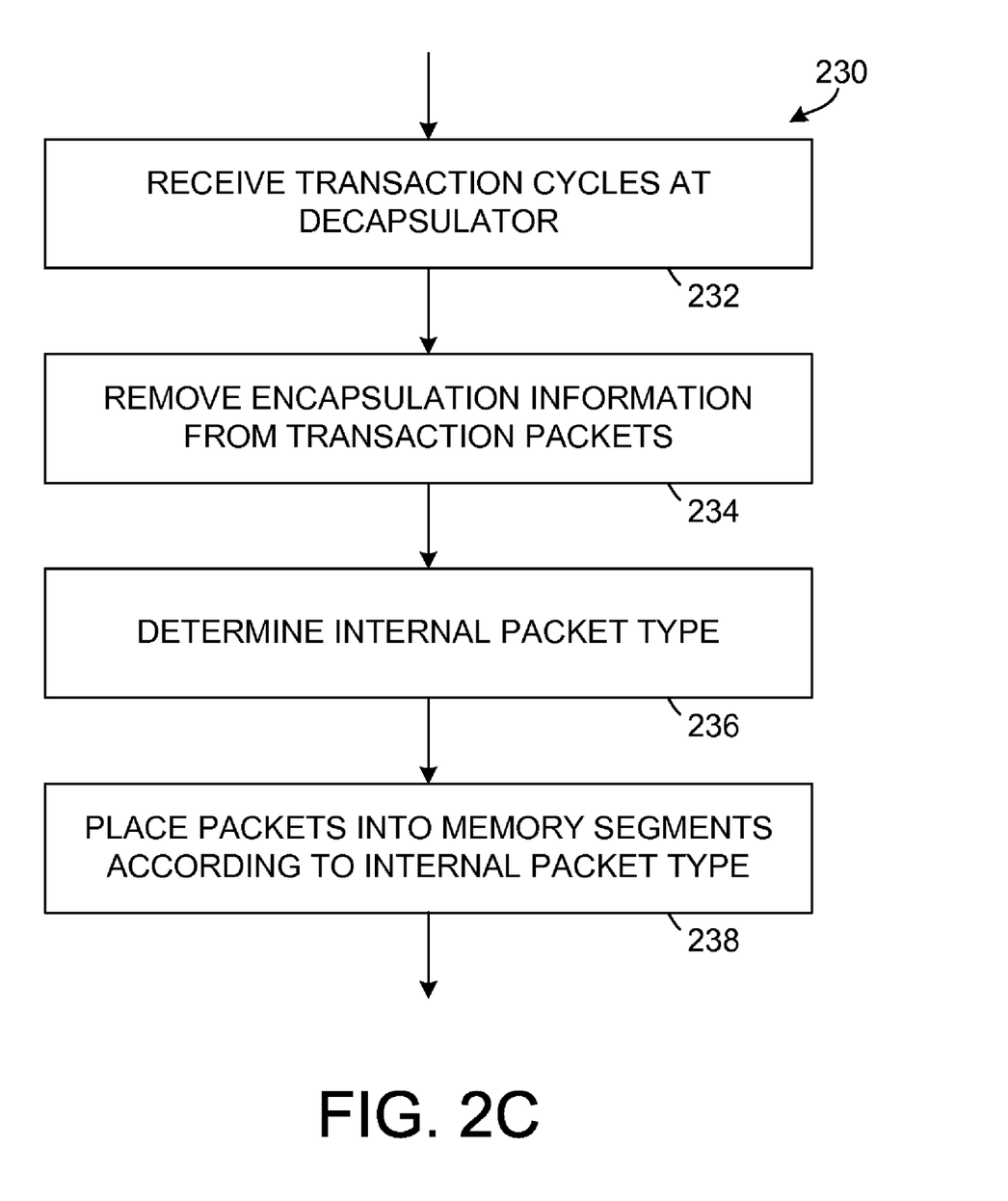

Referring to FIG. 2C, a control method 230 can further comprise receiving 232 at a decapsulator a plurality of transaction cycles at the target device, removing 234 encapsulation information from transaction packets, and determining 236 internal packet type. Packets can be placed 238 into the memory segment plurality according to the internal packet type.

Figure 2D:
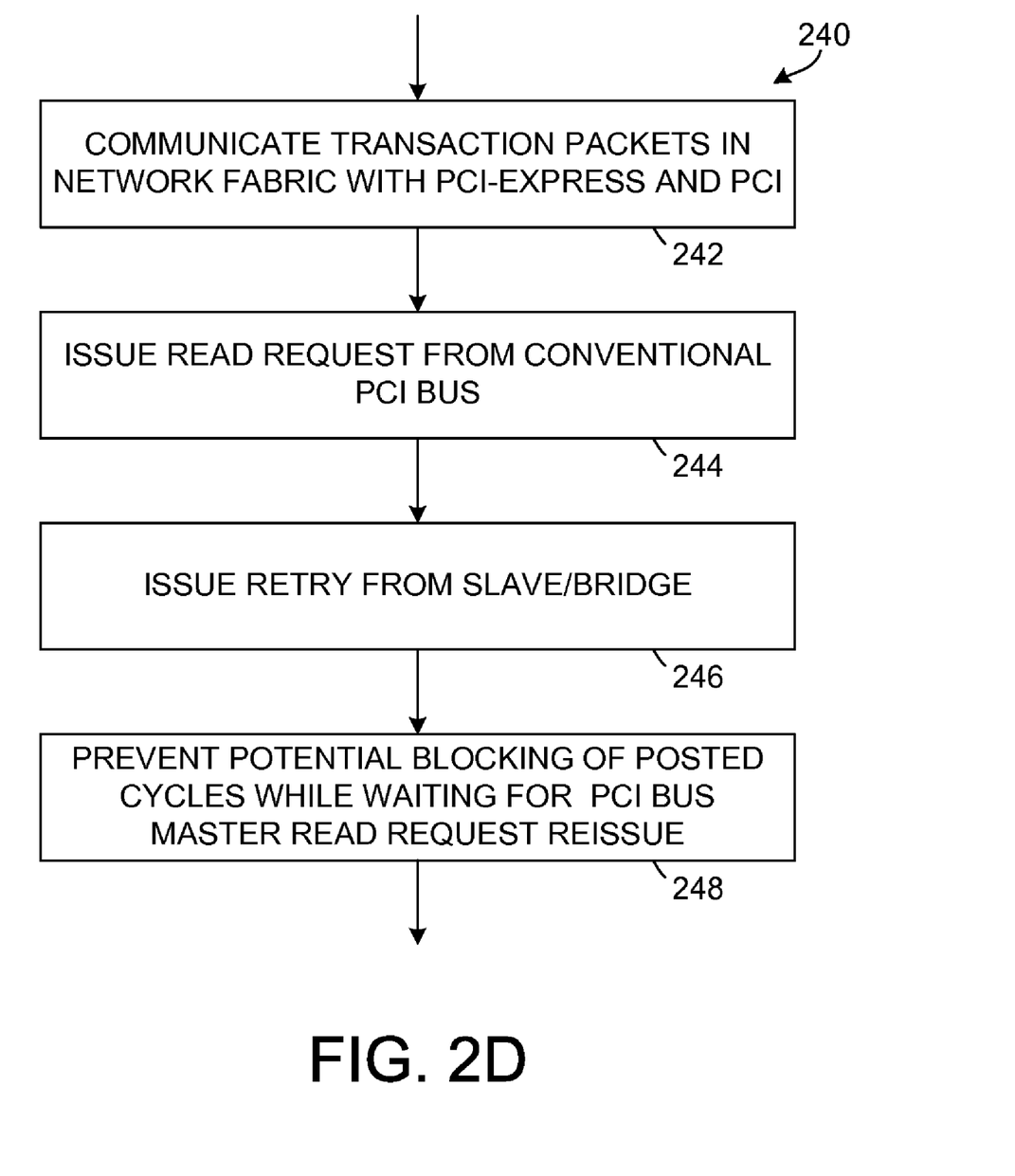

Referring to FIG. 2D, a flow chart illustrates another method that can be used for controlling 240 transaction flow in the network. The method 240 comprises communicating 242 transaction packets in a network fabric that includes a Peripheral Component Interconnect (PCI)-Express fabric coupled by a bridge to a conventional PCI bus. A read request can be issued 244 from a conventional PCI bus master and a retry issued 246 from a slave/bridge. The highest priority of the posted cycles prevents 248 potential blocking of posted cycles by completion resulting from the read request while waiting for the conventional PCI bus master to reissue the read request.

The depicted computing system and operating methods are beneficial in several aspects. The illustrative system and method deliver packets in a timely fashion to end devices while avoiding bottlenecks caused by lack of adherence to PCI Express ordering rules. The system and method are consistent with industry standards for input/output (I/O) devices and can be implemented with no software changes at the I/O device driver level in a manner that is transparent at the operating system (OS) level. The illustrative system and method can result in lower systems cost and complements system management capabilities, reducing or minimizing hardware changes so that value is added to users. The illustrative technique enables extensions to other management paradigms.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executed method for controlling transaction flow in a network comprising:
   communicating transaction packets among a plurality of devices in a network fabric;
   subdividing a memory into a plurality of memory segments for storing received transaction cycles according to transaction cycle type of the transaction packets, the transaction cycle types comprising posted, non-posted, and completion cycles;
   advertising from each of the plurality of devices, a number of posted, non-posted, and completion cycles a respective device can handle, indicative of the capacity of the memory segments for storing received transaction cycles;

receiving a plurality of transaction cycles in the memory segment plurality at a target device;

allocating transaction cycle priority according to transaction cycle type wherein posted cycles have highest priority; and retrieving cycles from the memory segment plurality in an order determined by the allocated transaction cycle priority.

2. The method according to claim 1 further comprising:
communicating transaction packets end-to-end between a plurality of end devices in a Peripheral Component Interconnect (PCI)-Express fabric.

3. The method according to claim 1 further comprising:
initializing end-to-end flow control between a plurality of end devices comprising:
  determining, at an initializing end device, capacity of the memory segment plurality for storing received transaction cycles for the posted, the non-posted, and the completion cycles; and
  advertising from the initializing end device the packet indicative of the respective capacities of the memory segments.

4. The method according to claim 3 further comprising:
initializing end-to-end flow control between a plurality of end devices comprising:
  advertising, from one of the plurality of end devices, capacity for handling posted, non-posted, and completion cycles using buffer flow control packets (BFCP).

5. The method according to claim 1 further comprising:
receiving, at a decapsulator, a plurality of transaction cycles at the target device;
removing encapsulation information from transaction packets;
determining internal packet type; and
placing packets into the memory segment plurality according to the internal packet type.

6. The method according to claim 1 further comprising:
allocating transaction cycle priority according to transaction cycle type wherein posted cycles have highest priority and completion cycles have lowest priority.

7. The method according to claim 1 further comprising:
communicating transaction packets in a network fabric that includes a Peripheral Component Interconnect (PCI)-Express fabric coupled by a bridge to a conventional PCI bus;
issuing a read request from a conventional PCI bus master; and
issuing a retry from a slave/bridge, the highest priority of the posted cycles preventing potential blocking of posted cycles by completion resulting from the read request while waiting for the conventional PCI bus master to reissue the read request.

8. A computing system comprising:
a plurality of devices;
a network fabric interconnecting the device plurality;
a logic that controls the device plurality and the network fabric to control transaction flow control, the logic operative to:
  subdivide a memory into a plurality of memory segments for storing received transaction cycles according to transaction cycle type of the transaction packets, the transaction cycle types comprising posted, non-posted, and completion cycles; and allocate transaction cycle priority according to transaction cycle type wherein posted cycles have highest priority; and
  advertise, from each of the plurality of devices, a number of posted, non-posted, and completion cycles a respective device can handle, indicative of the capacity of the memory segments for storing received transaction cycles.

9. The computing system according to claim 8 further comprising:
the logic further operative to communicate transaction packets among the plurality of devices in a network fabric, receive a plurality of transaction cycles in the memory segment plurality at a target device, and retrieve cycles from the memory segment plurality in an order determined by the allocated transaction cycle priority.

10. The computing system according to claim 8 further comprising:
the logic further operative to communicate transaction packets end-to-end between a plurality of end devices in a Peripheral Component Interconnect (PCI)-Express fabric.

11. The computing system according to claim 8 further comprising:
the logic further operative to initialize end-to-end flow control between a plurality of end devices by determining, at an initializing end device, capacity of the memory segment plurality for storing received transaction cycles for the posted, the non-posted, and the completion cycles; and advertising from the initializing end device the packet indicative of the respective capacities of the memory segments.

12. The computing system according to claim 8 further comprising:
decapsulator that receives a plurality of transaction cycles at the target device, removes encapsulation information from transaction packets, determines internal packet type, and places packets into the memory segment plurality according to the internal packet type.

13. The computing system according to claim 8 further comprising:
the logic further operative to allocate transaction cycle priority according to transaction cycle type wherein posted cycles have highest priority and completion cycles have lowest priority.

14. The computing system according to claim 8 further comprising:
the network fabric comprising a Peripheral Component Interconnect (PCI)-Express fabric coupled by a bridge to a conventional PCI bus; and
the logic communicating transaction packets on the network fabric, issuing a read request from a conventional PCI bus master, and issuing a retry from a slave/bridge, the highest priority of the posted cycles preventing potential blocking of posted cycles by completion resulting from the read request while waiting for the conventional PCI bus master to reissue the read request.

15. An article of manufacture comprising:
a controller-usable non-transitory medium having a computer readable program code embodied therein for controlling transaction flow in a network, the computer readable program code further comprising:
  a code causing the controller to communicate transaction packets among a plurality of devices in a network fabric;
  a code causing the controller to subdivide a memory into a plurality of memory segments for storing received transaction cycles according to transaction cycle type of the transaction packets, the transaction cycle types comprising posted, non-posted, and completion cycles;

a code causing the controller to advertise, from each of the plurality of devices, a number of posted, non-posted, and completion cycles a respective device can handle, indicative of the capacity of the memory segments for storing received transaction cycles;

a code causing the controller to receive a plurality of transaction cycles in the memory segment plurality at a target device;

a code causing the controller to allocate transaction cycle priority according to transaction cycle type wherein posted cycles have highest priority; and a code causing the controller to retrieve cycles from the memory segment plurality in an order determined by the allocated transaction cycle priority.

16. The article of manufacture according to claim 15 further comprising:

a code causing the controller to initialize end-to-end flow control between a plurality of end devices comprising:

a code causing the controller to determine at an initializing end device capacity of the memory segment plurality for storing received transaction cycles for the posted, the non-posted, and the completion cycles; and a code causing the controller to advertise from the initializing end device the packet indicative of the respective capacities of the memory segments.

17. The article of manufacture according to claim 15 further comprising:

a code causing the controller to receive, at a decapsulator, a plurality of transaction cycles at the target device;

a code causing the controller to remove encapsulation information from transaction packets;

a code causing the controller to determine internal packet type; and a code causing the controller to place packets into the memory segment plurality according to the internal packet type.

18. The article of manufacture according to claim 15 further comprising:

a code causing the controller to communicate transaction packets in a network fabric that includes a Peripheral Component Interconnect (PCI)-Express fabric coupled by a bridge to a conventional PCI bus;

a code causing the controller to issue a read request from a conventional PCI bus master;

a code causing the controller to issue a retry from a slave/bridge, the highest priority of the posted cycles preventing potential blocking of posted cycles by completion resulting from the read request while waiting for the conventional PCI bus master to reissue the read request.

* * * * *